United States Patent [19]

Moriyama et al.

[11] Patent Number: 4,493,100
[45] Date of Patent: Jan. 8, 1985

[54] APPARATUS FOR CONTROLLING AIR CONDITIONER BY VOICE

[75] Inventors: Masakazu Moriyama; Takao Saito, both of Aichi, Japan

[73] Assignee: Toyota Jidosha Kogyo Kabushikik Kaisha, Toyota, Japan

[21] Appl. No.: 351,883

[22] Filed: Feb. 24, 1982

[30] Foreign Application Priority Data

Mar. 9, 1981 [JP] Japan .................................. 56-33471

[51] Int. Cl.$^3$ ........................ G10L 1/00; G05D 23/00
[52] U.S. Cl. .................................. 381/43; 236/46 F; 236/51; 236/1 R
[58] Field of Search ..................... 381/110, 43, 44, 86; 364/513, 513.5, 424; 236/46 F, 51, 1 R

[56] References Cited

U.S. PATENT DOCUMENTS 4,419,730  12/1983  Ito et al. .............................. 364/424

OTHER PUBLICATIONS

Flanagan, "Computers that Talk and Listen", IEEE Proc., pp. 405-415.

Primary Examiner—E. S. Matt Kemeny
Attorney, Agent, or Firm—Kenyon & Kenyon

[57] ABSTRACT

Voice commands of two types are recognized by an air conditioner: (1) a first command to jump to a different air delivery (below-out) temperature, after which a gradual automatic return to the previously set temperature occurs, or (2) a second command which will stop the automatic return at some arbitrary temperature.

14 Claims, 9 Drawing Figures

APPARATUS FOR CONTROLLING AIR CONDITIONER BY VOICE

BACKGROUND OF THE INVENTION

1. Field of the Invention

This invention relates to apparatus for controlling air conditioners, and particularly to such an apparatus for controlling a variety of air conditioning modes by use of a computer and a voice recognizing equipment.

2. Description of the Prior Art

Vehicles such as motor cars may be provided with air conditioners, with which ventilation, air cooling and the like may be performed as necessary. In the conventional air conditioners, all of the various operations such as selection of modes, regulation of air flow, control of air cooling and warming and the like have relied on the manual operation of an operator. Manual operation is cumbersome and can interfere with safe driving.

SUMMARY OF THE INVENTION

The present invention has as its object the provision of an apparatus for controlling delivered air temperature from an air conditioner by voice command.

The present invention contemplates that predetermined voice commands are given to a computer as commands to raise or lower output temperature through a voice recognizing equipment, whereby a required delivered air temperature is reset.

DETAILED DESCRIPTION OF THE INVENTION

Figure 1:
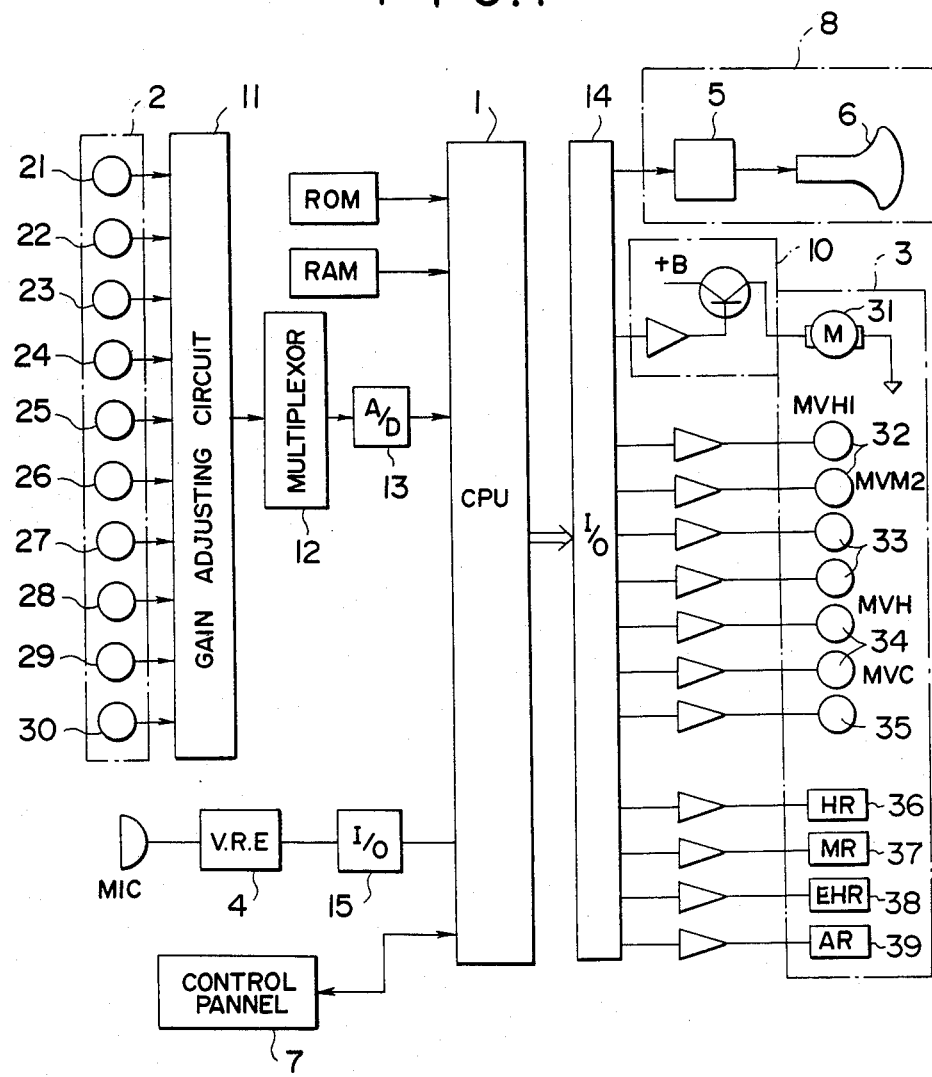
FIG. 1 is a block diagram showing one embodiment of the present invention.

FIG. 1 is a block diagram showing one embodiment of the present invention.

A central processing unit (hereinafter referred to as "CPU") 1 is connected with a sensor unit 2, a component 3 being controlled, a voice recognizing equipment 4, further, with ROM (READ ONLY MEMORY) and RAM (RANDOM ACCESS MEMORY) memories, and still further, with a multi-display device 8 (including a CRT controller 5 and a color CRT 6) for displaying various data.

The sensor unit 2 includes an internal temperature sensor 21, an external temperature sensor 22, a water temperature sensor 23, an evaporator outlet sensor 24, a potentiometer 25 for indicating an opening of air mix damper, a sunlight sensor 26, a humidity sensor 27, a condensation sensor 28 and an air contamination sensor 29. Since these sensors have dispersions in detecting sensibility, output and the like, gains of these sensors are adjusted in a gain adjusting circuit 11. As a result, characteristics of outputs from the gain adjusting circuit 11 inputted to an A/D converter 13 at the succeeding step through a multiplexer 12 are adjusted to be uniform in the analogue level. The A/D converter 13 outputs a digital signal to CPU 1 corresponding to an analogue voltage.

The component 3 being controlled includes a blower motor 31 driven by a driving circuit 10, a valve 32 for switching the blow-out openings, a valve 33 for switching from recirculated air to fresh air delivery and vice versa, a valve 34 for an A/M damper, a water valve 35, a heater relay (HR) 36, a magnet clutch relay (MR) 37, an Ex-Hi relay (EHR) 38 and an air purifier control relay (AR) 39. The thus included parts are driven through drivers or exclusive amplifiers, and all the connections therebetween are controlled by CPU 1 through an I/O (input/output circuit) 14. Similarly, the multi-display device 8 is driven by CPU 1 through I/O 14. All the controls studied in the present invention are effected centered around this core of CPU 1.

Description will hereunder be given of the details of controls effected by CPU 1 as described above with reference to the flow charts.

Figure 2:
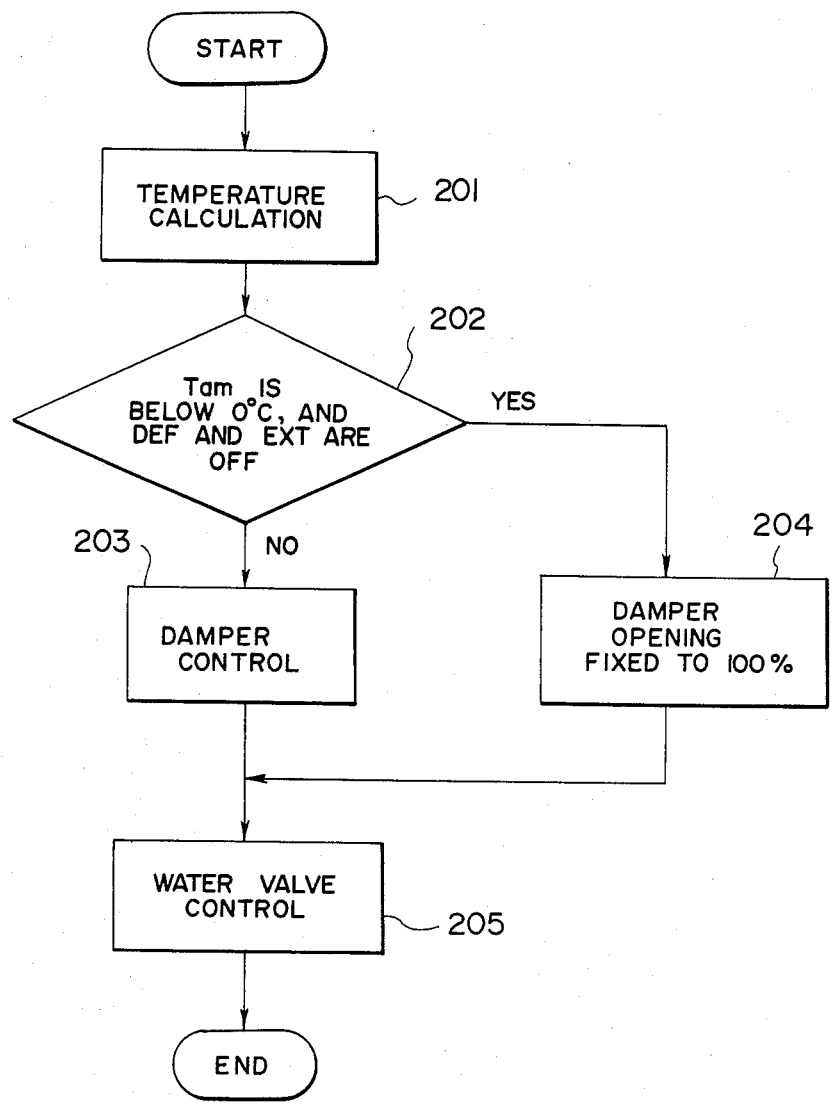
FIG. 2 is a process flow chart showing the fundamental control according to the present invention.

Firstly, as A/M (Air Mixture) damper opening calculation a fundamental control in the air conditioner control, A/M damper control and basic temperature control are processed by CPU 1 in accordance with the flow chart shown in FIG. 2. In step 201, the internal air temperature Tr, ambient air temperature Tam and sunlight temperature ST are taken in so as to correct a set value of room temperature. Namely, the set value Tset stored in the memory is corrected by the ambient air temperature Tam and the sunlight temperature ST as follows:

$$Tset = Kset - Ka1(Tam - 10) - Ka2 \cdot ST \qquad (1)$$

where Ka1 and Ka2 are constants and the unit of the sunlight temperature is Kcal/m$^2$·min.

Subsequently, a required delivered air temperature Tao is calculated through an equation (2) shown below based on the set temperature Tset calculated through the equation (1).

$$Tao = Kset \cdot Tset - Kam \cdot Tam - Kr \cdot Tr - Ks \cdot ST + C \qquad (2)$$

where Kset, Kam, Kr, Ks and C are constants.

Figure 3:
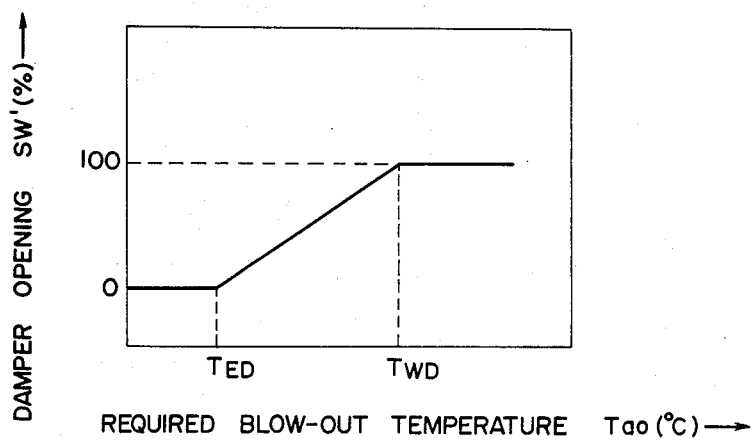
FIG. 3 is a curve of damper opening characteristics in relation to required delivered air temperatures.

Further, the damper opening SW' is obtained based on the required delivered air temperature Tao (°C.) as shown in FIG. 3, the damper opening SW is set to an opening of 100% based on a corrected water temperature $T_{WD}$ (°C.) to be described hereunder, and a corrected evaporator outlet temperature Ted is set to an opening of 0% of the damper opening SW. In this case, Twd and Ted are calculated through equations shown below.

$$Twd = (Tw - Ted)\phi + Ted \qquad (3)$$

$$Ted = Te + 3 \qquad (4)$$

where Tw is water temperature, $\phi$ a constant and Te the evaporator outlet temperature.

Figure 4:
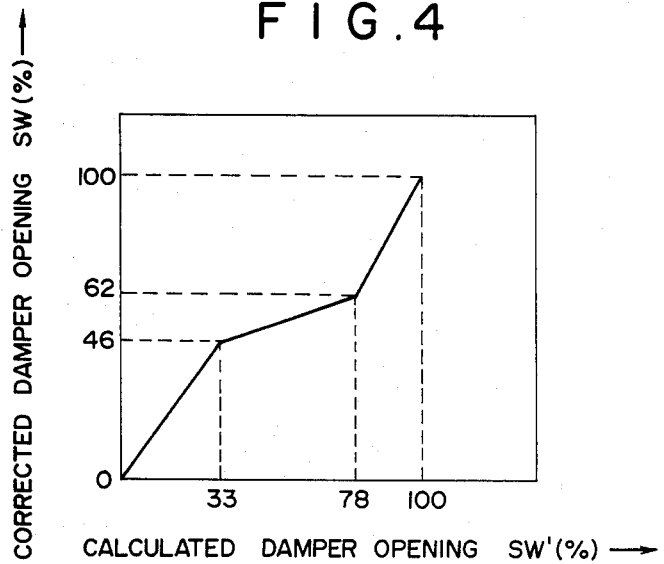
FIG. 4 is an explanatory view showing the damper opening correction.
Figure 5:
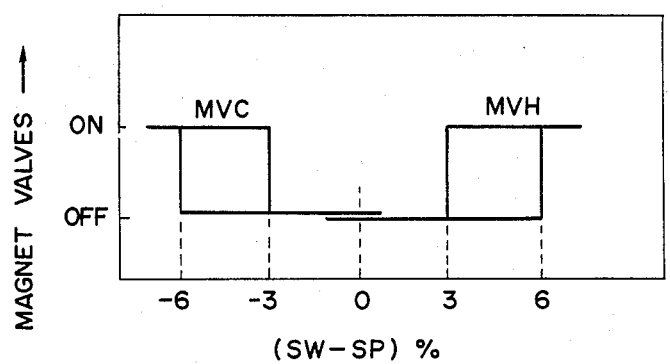
FIG. 5 is an explanatory view showing the control characteristic of a magnet valve.

However, when DEF of the air conditioner and dampers of EXT-Hi are "OFF" and the ambient air temperature Tam is below 0° C., the opening of the A/M damper is fixed to 100% (the highest temperature range) (Steps 202 and 204). When it is judged that the above described conditions are not fulfilled, the damper opening correcting process commences. Namely, the damper opening obtained in accordance with FIG. 3 is corrected in accordance with FIG. 4. Further, magnet valves 34 (MVC, MVH) shown in FIG. 1 are controlled to obtain the characteristics shown in FIG. 5, so that the damper opening SW' obtained in accordance with FIG. 4 can coincide with the actual A/M damper opening SP. When the characteristics shown in FIG. 5 are obtained, the process terminates.

Figure 6:
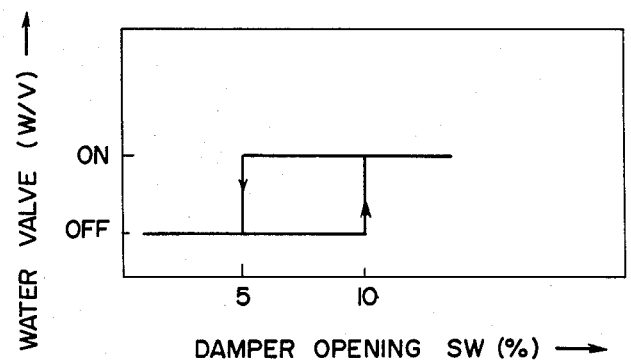
FIG. 6 is an explanatory view showing the control characteristic of a water valve.

Additionally, the water valve WV is controlled so as to obtain the characteristics shown in FIG. 6. This process corresponds to the process in step 205 shown in FIG. 2. The water valve WV is on-off operated within the range of the thus set damper opening. In an example shown in FIG. 6, the water valve WV is controlled within the range of 5 to 10%. Description will hereunder be given of compressor control.

The compressor control is stopped by an external control signal (given by a panel switch of a control panel 7 or the like) and a voice signal when a heater relay 36 is "OFF" and the air conditioner is "OFF". In operation, the compressor is controlled by four modes shown below.

(i) control by the ambient air temperature Tam
(ii) control by (Tao−Tam)
(iii) control by (Tao−Te)
(iv) control by relative humidity RH and discomfort index Di (RH−Di)

For example, the above described controls may be based on data given by the control panel 7 (a magnetic card, a magnetic tape or the like), or based on data stored in ROM and selected by the panel switch of the control panel 7.

The control by the ambient air temperature Tam mentioned in (i) above is carried out such that the compressor is turned "ON" when the ambient air temperature exceeds a predetermined value, and the compressor is turned "OFF" when the ambient air temperature is below the predetermined value, making a control mode relying only on the ambient air temperature Tam. The control by (Tao−Tam) mentioned in (ii) above is carried out such that a difference in temperature between the recirculated air and the fresh air is set at a predetermined value, referenced from which the compressor is on-off operated. The control by (Tao−Te) mentioned in (iii) above is carried out such that, for example, when a difference in temperature between the recirculated air and the fresh air is 1° C., the compressor is turned "ON", and, when the difference is 3° C., the compressor is turned "OFF". The control by (RH−Di) mentioned in (iv) above is carried out such that, for example, when the above described difference is 5%, the compressor is turned "ON" and, when the difference is 0%, the compressor is turned "OFF".

In addition to the above described on-off control of the air conditioner, the controls of the air conditioner include recirculated air-fresh air switching control, air outlet control, air flow control, condensation control and air purifier control.

Out of the above described controls, reset of the delivered air temperature according to the present invention will hereunder be described in detail.

Figure 7:
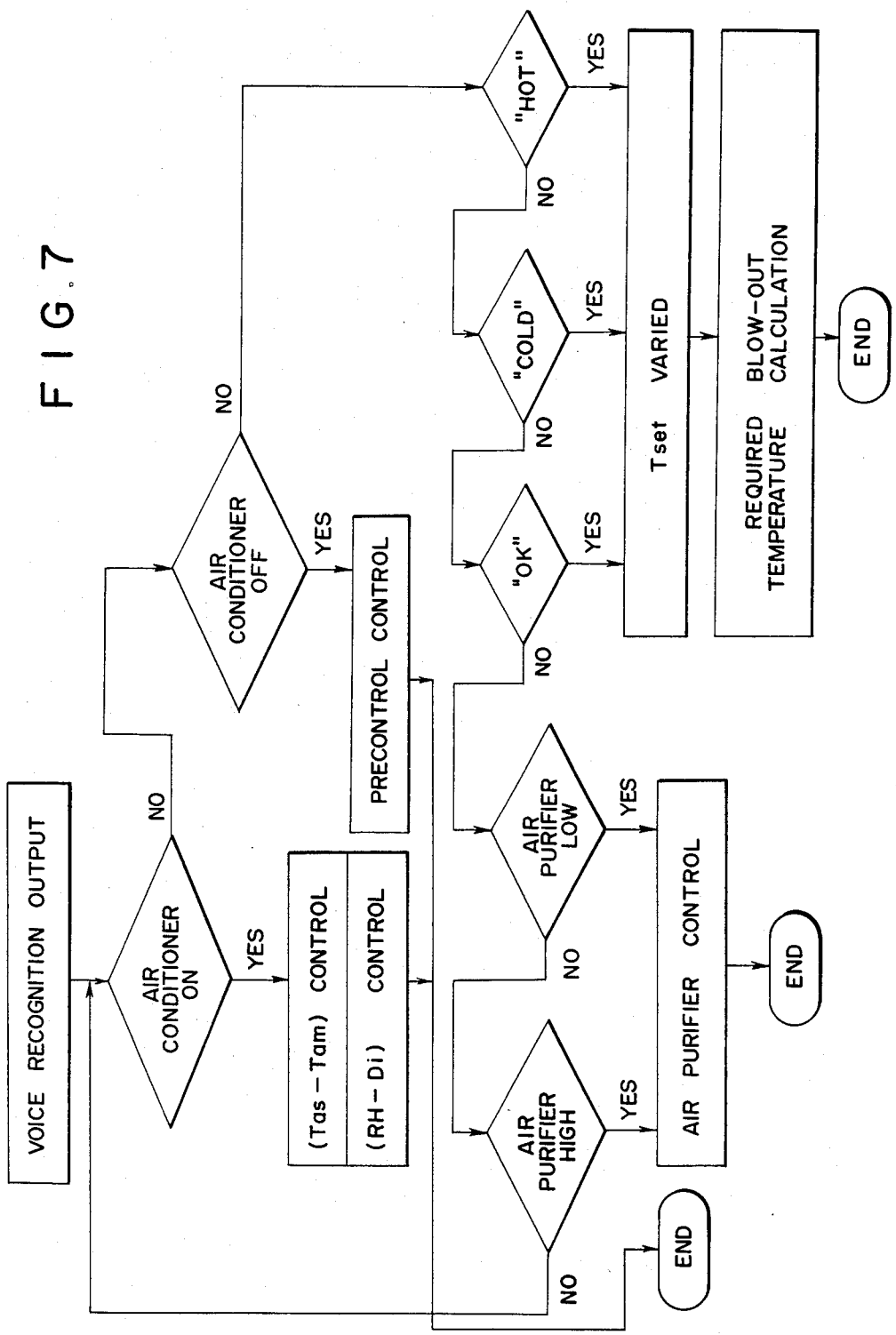
FIG. 7 is a process flow chart showing the control by voice command according to the present invention.

FIG. 7 shows a flow chart of control by voice commands.

As shown in FIG. 1, a voice command received by MIC is signal-processed by the voice recognizing equipment 4. The voice recognizing equipment 4 passes a voice input through a band pass filter, not shown, divided into a plurality of frequency bands, and outputs thus filtered are successively and selectively outputted through the multiplexer. These outputs (analogue signals) from the multiplexer are A/D converted into digital signals, outputted to I/O 15 and transferred to CPU 1. The voice signals are desirably encoded only by changing the written-in contents, however, in the embodiment of the present invention, only six types thereof are exemplified. In addition, normally, control modes (for example, a manual operation by use of a panel switch) having priority over the voice control are present, and further, control modes (controls by use of various sensors and external components) being lower in the order of priority than the voice control are present.

In the voice control to be described hereunder, all of the controls having priority over the voice control are in non-operation conditions, and only the voice control is functioning and in a stand-by condition. Additionally, the respective voice commands are constantly, sequentially decoded by the software of CPU 1 to be successively read.

When the user requires the air conditioning, he pronounces a predetermined command such as "Air conditioner on". Upon receiving this voice command, CPU 1 commences (Tao−Tam) control or (RH−Di) control out of the abovedescribed air conditioner controls, i.e., brings about the normal control condition. Simultaneously with the commencement of this mode, a term "A or C" is displayed on a CRT display. Additionally, a selection is made by an A/C switch on the control panel 7. In this case, the user selects either (Tao−Tam) control or (RH−Di) control through the magnetic card, magnetic tape, panel switch or the like.

To stop the air conditioner operation, the user pronounces a predetermined term such as "Air conditioner off". In this case, CPU 1 moves to a precontrol. The precontrol functions only when the "A/C" switch is manually turned off or "Air conditioner off" takes place, and has the following two control contents.

Figure 8:
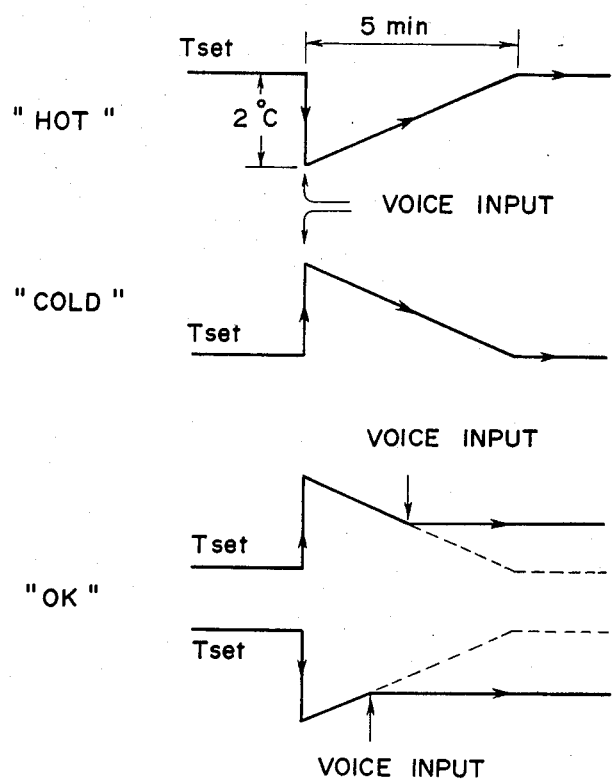
FIGS. 8 and 9 are curves showing the control for resetting delivered air temperatures.

(a) Turning the heater relay 36 "OFF", and turning the compressor "OFF"
(b) Performing A/M damper control, water-valve control and air outlet control in normal ways The function of changing the required delivered air temperature Tao preferably is, manually performed by the user in all air conditioners. In this case, however, the function can be performed by the voice in addition to the manual operation. This can be done by changing the contents of the above described equation (1). Pronouncing predetermined terms such as "HOT", "COLD" and "OK" gives three modes of lowering, elevating and holding the delivered air temperature Tao. As shown in FIG. 8, the set temperature Tset is quickly lowered by 2° C. for example by pronouncing the term "HOT". Thereafter, the temperature is gradually raised and restored to the original condition in a predetermined period of time (five minutes for example). In the same manner as above, the temperature is immediately elevated by 2° C. by pronouncing the term "COLD"; thereafter, the temperature is gradually lowered and restored to the original condition in a predetermined period of time. If the term "OK" is pronounced during the elevation or lowering of the temperature, the then temperature is maintained as the set temperature Tset. Additionally, when either "HOT" or "COLD" are functioning, the reset of the set temperature Tset is not acceptable. Consequently, when a change is desired, the term "OK" should be pronounced.

The conditions described above are indicated by the CRT display 6 or the control panel 7. When "HOT" is functioning, the term "COOLING" is displayed, when "COLD" is functioning, the term "WARMING" is displayed and when "OK" is functioning, a numerical value of the set temperature Tset is indicated. Durations of these voice controlled modes are controlled through a software timer by CPU 1, and a specified mode is maintained for five minutes, for example.

Figure 9:
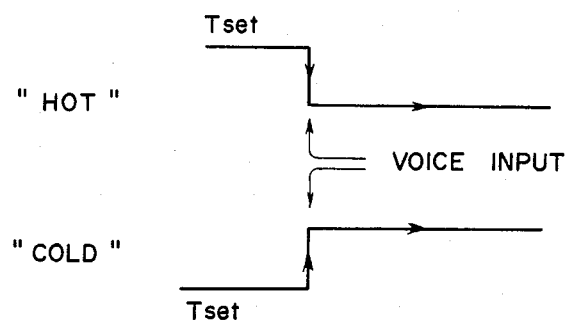

FIG. 9 shows another example of air conditioner control by voice, in which the delivered air temperature is elevated or lowered at once by a predetermined temperature difference. Namely, pronouncing the term "HOT" lowers the temperature from the set temperature Tset by a predetermined temperature difference, e.g., 2° C., and pronouncing the term "COLD" raises the temperature from the set temperature Tset by a predetermined temperature difference, e.g., 2° C. In this case, the temperature after the raising or the lowering is to be maintained at a predetermined value. Durations of the voice controlled modes are controlled through a software timer by CPU 1, and a specified mode is maintained for five minutes, for example.

As has been described hereinabove, according to the present invention, changes in the set temperature of the delivered air from the air conditioner can be controlled not only by manual operation but also by voice. As a consequence, even when the motor car is running, the user can control the air conditioner without letting his hand go off the steering wheel, thereby improving the safety of driving conditions yet quickly controlling the air conditioner.

The above described embodiment has shown an example in which the apparatus is applied to an air conditioner in a motor car; however, it may be applied to an air conditioner installed in a house.

What is claimed is:

1. Apparatus for controlling an air conditioner by voice command, the apparatus comprising:
   (a) air mixing means for mixing cool air and hot air introduced to a space to adjust a temperature of air delivered from the air conditioner;
   (b) voice recognizing means for recognizing a voice command and for delivering a command signal corresponding to the voice command, said voice command representing one of a command to increase the delivered air temperature and a command to decrease the delivered air temperature; and
   (c) control means for controlling said mixing means such that the delivered air temperature is stepwise increased in response to a command signal to increase the temperature and then is gradually decreased until the delivered air temperature is returned to a previously set level, and the delivered air temperature is stepwise decreased in response to a command signal to decrease the temperature and then is gradually increased until the delivered air temperature is returned to a previously set level.

2. Apparatus for controlling an air conditioner by voice command according to claim 1, further comprising a display means responsive to said corresponding command signal for displaying an indication representative of said voice command.

3. Apparatus for controlling an air conditioner by voice command according to claim 1, wherein said control means comprises a calculating means, said calculating means calculating a desired temperature of the delivered air in accordance with various parameters including at least an internal temperature of said space, an ambient air temperature, and a set temperature changed by corresponding command signal and producing a temperature signal according to the thus calculated temperature.

4. Apparatus for controlling an air conditioner by voice command according to claim 3, further comprising a display means responsive to said corresponding command signal for displaying an indication representative of said voice command.

5. Apparatus for controlling an air conditioner by voice command according to claim 3, wherein while said set temperature is being changed in response to one vocal announcement, no change of said set temperature is obtainable in response to another voice announcement.

6. Apparatus for controlling an air conditioner by voice command according to claim 3, wherein while said temperature of the delivered air is being controlled by the voice, no change of set temperature is obtainable by manual operation.

7. Apparatus for controlling an air conditioner by voice command according to claim 6, further comprising a display means responsive to said corresponding command signal for displaying an indication representative of said voice command.

8. Apparatus for controlling an air conditioner by voice command, the apparatus comprising:
   (a) mixing means for mixing cool air and hot air introduced to a space so as to adjust a temperature of air delivered from the air conditioner;
   (b) a voice recognizing means for recognizing a voice command and for delivering a command signal corresponding to the voice command, said voice command representing one of a command to increase the delivered air temperature, a command to decrease the delivered air temperature, and a command to interrupt a change of the delivered air temperature; and
   (c) control means for controlling said mixing means such that the temperature is stepwise increased in response to a command signal representative of a command to increase the temperature and then is gradually decreased for a predetermined period of time, and the temperature is stepwise decreased in response to a command signal representative of a command to decrease the temperature and then is gradually increased for a predetermined period of time, and for controlling said mixing means such that the temperature is maintained as it is in response to a command signal representative of a command to interrupt a change of the temperature received by said voice recognizing means within said predetermined period of time.

9. Apparatus for controlling an air conditioner by voice command according to claim 8, further comprising a display means responsive to said corresponding command signal for displaying an indication representative of said voice command.

10. Apparatus for controlling an air conditioner by voice command according to claim 8, wherein said control means comprises a calculating means, said calculating means calculating a desired temperature of the delivered air in accordance with various parameters including at least an internal temperature of said space, an ambient air temperature, and a set temperature changed by corresponding command signal and producing a temperature signal according to the thus calculated temperature.

11. Apparatus for controlling an air conditioner by voice command according to claim 10, further comprising a display means responsive to said corresponding command signal for displaying an indication representative of said vocal information.

12. Apparatus for controlling an air conditioner by voice command according to claim 10, wherein while said set temperature is being changed in response to one vocal announcement, no change of said set temperature is obtainable in response to another voice announcement.

13. Apparatus for controlling an air conditioner by voice command according to claim 10, wherein while said temperature of the air is being controlled by the voice, no change of set temperature is obtainable by manual operation.

14. Apparatus for controlling an air conditioner by voice command according to claim 13, further comprising a display means responsive to said corresponding command signal for displaying an indication representative of said vocal information.

* * * * *